US011006709B2

(12) United States Patent
Friederich et al.

(10) Patent No.: US 11,006,709 B2
(45) Date of Patent: May 18, 2021

(54) CANE WITH DEPLOYABLE SUPPORT STRUCTURE

(71) Applicants: United States Government as Represented by the Department of Veterans Affairs, Washington, DC (US); CHALLENGE AMERICA, Basalt, CO (US)

(72) Inventors: Aidan Richard Wilhelm Friederich, Conifer, CO (US); Christopher Lee Carter, Warren, OH (US); Angela Payton, Mansfield, OH (US); Michael Christopher Tracz, Brecksville, OH (US); Emily Rose Szabo, Strongsville, OH (US); Elle Marcus, Lakewood, OH (US); Michael Fugate, Cleveland, OH (US); Jason Grenfell, Streetsboro, OH (US); Scott Rawlings, North Ridgeville, OH (US)

(73) Assignees: United States Government as Represented by the Department of Veterand Affairs, Washington, DC (US); Challenge America, Basalt, CO (US)

( * ) Notice: Subject to any disclaimer, the term of this patent is extended or adjusted under 35 U.S.C. 154(b) by 0 days.

(21) Appl. No.: 16/857,951

(22) Filed: Apr. 24, 2020

(65) Prior Publication Data
US 2020/0337424 A1  Oct. 29, 2020

Related U.S. Application Data

(60) Provisional application No. 62/840,197, filed on Apr. 29, 2019, provisional application No. 62/838,802, filed on Apr. 25, 2019.

(51) Int. Cl.
*A45B 5/00* (2006.01)
*A61H 3/02* (2006.01)
(Continued)

(52) U.S. Cl.
CPC .................. *A45B 5/00* (2013.01); *A45B 9/02* (2013.01); *F16M 13/08* (2013.01); *A45B 2009/002* (2013.01); *A61H 2003/0272* (2013.01)

(58) Field of Classification Search
CPC .......................... A45B 5/00; A61H 2003/0272
See application file for complete search history.

(56) References Cited

U.S. PATENT DOCUMENTS

| 1,942,925 A | 2/1932 | Jenkins |
| 2,629,429 A | 6/1950 | Baumfeld et al. |

(Continued)

FOREIGN PATENT DOCUMENTS

| DE | 102009060095 A1 * | 6/2011 | ........... A61H 3/0244 |
| EP | 2241796 | 10/2010 | |
| FR | 2764963 | 2/2000 | |

OTHER PUBLICATIONS

English translation of DE102009060095A1 from espacenet.com.*
(Continued)

*Primary Examiner* — David R Dunn
*Assistant Examiner* — Danielle Jackson
(74) *Attorney, Agent, or Firm* — Ballard Spahr LLP

(57) ABSTRACT

A cane having: a primary leg with a top end and an opposed bottom end; a handle coupled to the top end of the primary leg; and at least two secondary legs that are each pivotably coupled to the primary leg between the top and bottom ends of the primary leg. Each of the at least two secondary legs is pivotable between a first, retracted position and a second, deployed position.

14 Claims, 8 Drawing Sheets

(51) Int. Cl.
*F16M 13/08* (2006.01)
*A45B 9/02* (2006.01)
*A45B 9/00* (2006.01)

(56) References Cited

U.S. PATENT DOCUMENTS

| | | | | | |
|---|---|---|---|---|---|
| 3,550,602 | A | * | 12/1970 | Greth | A45B 9/00 135/65 |
| 3,606,898 | A | * | 9/1971 | Harocopo | A61H 3/0244 135/68 |
| 3,999,565 | A | * | 12/1976 | Delacour | A45B 1/00 135/65 |
| 9,038,647 | B1 | * | 5/2015 | Scott | A61H 3/00 135/73 |
| 2004/0226593 | A1 | | 11/2004 | Robitaille et al. | |
| 2016/0213107 | A1 | | 7/2016 | Byrd et al. | |

OTHER PUBLICATIONS

PCT, PCT/US2020/29819 (WO, Apr. 24, 2020, Friederich.
International Search Report and Written Opinion for PCT/US2020/29819, dated Apr. 24, 2020.

\* cited by examiner

CANE WITH DEPLOYABLE SUPPORT STRUCTURE

CROSS-REFERENCE TO RELATED APPLICATIONS

This application claims priority to and the benefit of the filing date of U.S. Provisional Patent Application No. 62/838,802, filed Apr. 25, 2019, and U.S. Provisional Patent Application No. 62/840,197, filed Apr. 29, 2019. Both of these applications are incorporated herein by reference in their entireties.

FIELD

The disclosed invention relates to apparatuses and methods for enabling individuals to have a deployable support, in particular for enabling the individuals to raise and lower themselves.

BACKGROUND

Individuals with sustained nerve damage in the lower extremities may experience pain and weakness, resulting in difficulty moving down to the ground and standing up again. These individuals often lean on nearby objects to stabilize them, which is not conducive to all scenarios. Canes provide stability while walking, but this mechanism is not ideal for transfer to and from the ground.

Existing walking assistance devices such as canes are beneficial for providing stability while walking. However, there are limitations to a cane's usage. Canes have limited weight-bearing characteristics, and cannot be used to aid to regaining stability after a fall. If an individual falls to the ground, the individual can have limited resources to regain their footing and hoist themselves into an upright position. If the individual holds the cane upright against the ground to regain their footing, the cane handle may be configured too high to be comfortably grasped from the floor, and the cane's single contact point with the ground can also be unstable.

SUMMARY

In exemplary aspects, disclosed herein is a cane that includes a selectively deployable support and/or stabilizing structure. The cane can have a primary leg, a handle, and at least two secondary legs. The primary leg can have a top end and an opposed bottom end. The handle can be coupled to the top end of the primary leg. The at least two secondary legs can each be pivotably coupled to the primary leg between the top and bottom ends of the primary leg. Each of the at least two secondary legs can be pivotable between a first, retracted position and a second, deployed position.

Each of the at least two secondary legs can have a proximal end that is pivotably coupled to the primary leg and an opposed distal end. When the at least two secondary legs are in the deployed position, the distal end of each secondary leg and the bottom end of the primary leg can be configured to concurrently engage a surface upon which a user of the cane is walking or standing.

The handle can be selectively removable and replaceable.

A collar can define an opening that receives the primary leg, and the collar can be secured to the primary leg between the handle and the proximal ends of the at least two secondary legs. The collar can have a sleeve portion and a flange portion that extends radially outwardly from the sleeve portion to define a support surface.

The cane can include a connector assembly having: a connector body that defines an opening that receives the primary leg; and at least two connector projections extending from the connector body. Each secondary leg of the at least two secondary legs can be pivotably connected to a respective connector projection of the at least two connector projections.

The connector body can be selectively axially translatable along a length of the primary leg to effect movement of the at least two secondary legs about and between the retracted position and the deployed position.

The primary leg can include at least one stop element configured to engage the connector body to limit axial translation of the connector body along the primary leg. Optionally, the at least one stop element can comprise at least one button clip.

The cane can include a guide assembly having: a center coupling that defines an opening that receives the primary leg and is secured to the primary leg between the proximal ends of the at least two secondary legs and the bottom end of the primary leg; and at least two extension arms extending radially outwardly from the center coupling. Each extension arm of the at least two extension arms can be pivotably coupled to the center coupling and a respective secondary leg of the at least two secondary legs.

The guide assembly can further comprise at least two outer couplings. Each outer coupling of the at least two outer couplings can be secured to a respective secondary leg of the at least two secondary legs between the proximal and distal ends of the secondary leg. Each extension arm of the at least two extension arms can be pivotably coupled to the center coupling and a respective outer coupling of the at least two outer couplings.

The cane can include a retention assembly having: a center body that defines an opening that receives the primary leg and is secured to the primary leg between the proximal ends of the at least two secondary legs and the bottom end of the primary leg; and at least two retention elements extending radially outwardly from the center body and configured to engage a respective secondary leg of the at least two secondary legs when the at least two secondary legs are in the retracted position. Optionally, each retention element can include a mounting clip that is configured to receive a portion of a respective secondary leg of the at least two secondary legs.

Optionally, the at least two secondary legs consist of two secondary legs, and when the two secondary legs are in the deployed position, the distal ends of the two secondary legs and the bottom end of the primary leg provide three points of contact with the surface. The cane can further include a connector assembly having: a connector body that defines an opening that receives the primary leg; and at least two connector projections extending from the connector body; and two sleeves that each receive and are secured to a proximal end of a respective secondary leg of the two secondary legs. Each of the two sleeves can be pivotably coupled to a respective connector projection of the two connector projections. Optionally, the connector body is not axially translatable relative to a length of the primary leg. Optionally, the connector body can include two stop elements. Each of the two stop elements can overlie a respective connector projection and be configured to limit pivotal movement of a respective secondary leg relative to the connector projection. Optionally, the two connector projections extend radially outwardly from the connector body. Optionally, the connector body can further define first and second receiving spaces. A first connector projection of the two connector projections can extend downwardly into the first receiving space, and a second connector projection of the two connector projections can extend downwardly into the second receiving space. A first sleeve of the two sleeves can be at least partially received within the first receiving space, and wherein a second sleeve of the two sleeves is at least partially received within the second receiving space.

Optionally, the at least two secondary legs can consist of three secondary legs, and when the three secondary legs are in the deployed position, the distal ends of the three secondary legs and the bottom end of the primary leg can provide four points of contact with the surface.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings wherein.

DETAILED DESCRIPTION

Figure 1:
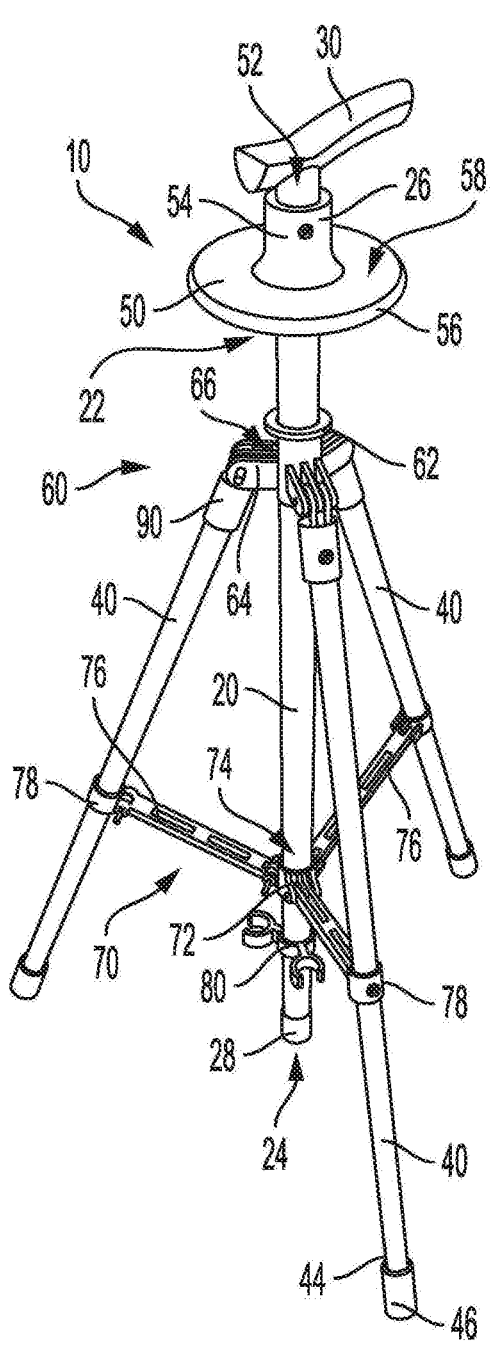
FIG. 1 is a perspective view of a deployable cane, in accordance with embodiments disclosed herein, in a deployed configuration.

The present invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, use of the term "a projection" can refer to one or more of such projections, use of the term "an opening" can refer to one or more of such openings, and so forth.

All technical and scientific terms used herein have the same meaning as commonly understood to one of ordinary skill in the art to which this invention belongs unless clearly indicated otherwise.

As used herein, the terms "optional" or "optionally" mean that the subsequently described event or circumstance may or may not occur, and that the description includes instances where said event or circumstance occurs and instances where it does not.

As used herein, the term "at least one of" is intended to be synonymous with "one or more of" For example, "at least one of A, B and C" explicitly includes only A, only B, only C, and combinations of each.

Ranges can be expressed herein as from "approximately" one particular value, and/or to "approximately" another particular value. When such a range is expressed, another aspect includes from the one particular value and/or to the other particular value. Similarly, when values are expressed as approximations, by use of the antecedent "approximately," it will be understood that the particular value forms another aspect. It will be further understood that the endpoints of each of the ranges are significant both in relation to the other endpoint, and independently of the other endpoint. Optionally, in some aspects, when values are approximated by use of the antecedent "approximately," it is contemplated that values within up to 15%, up to 10%, up to 5%, or up to 1% (above or below) of the particularly stated value can be included within the scope of those aspects.

The word "or" as used herein means any one member of a particular list and also includes any combination of members of that list.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the apparatus, system, and associated methods of using the apparatus can be implemented and used without employing these specific details. Indeed, the apparatus, system, and associated methods can be placed into practice by modifying the illustrated apparatus, system, and associated methods and can be used in conjunction with any other apparatus and techniques conventionally used in the industry.

Disclosed herein, in various aspects and with reference to the Figures, is a cane having a selectively deployable support structure. In use, it is contemplated that the disclosed canes can provide improved weight-bearing characteristics in comparison to conventional canes. It is further contemplated that the disclosed tripod canes can aid users in regaining stability after a fall, in contrast to conventional canes. More particularly, it is contemplated that the positioning of the handle and/or collar and/or connector assembly of the disclosed canes and/or the multiple points of contact between the canes and the ground can assist users with comfortably engaging the handle and/or collar and regaining their footing in a stable manner.

The cane can have two configurations: a walking mode (retracted configuration), in which secondary legs are folded in against the cane (primary leg) as further disclosed herein; and a deployed configuration, in which the secondary legs are spread from the cane (primary leg) to provide a supportive structure, which can optionally have a tripod configuration. The secondary legs can be shorter than the cane (primary leg) to allow the walking mode to have only one point of contact with the ground to retain normal cane functionality.

In exemplary aspects, and with reference to FIGS. 1-10B, a cane 10 can comprise a primary leg 20, which can have a top end 22 and an opposed bottom end 24. As used herein, the term "primary leg" refers to the shaft or other elongate structure of the cane 10 that provides support to the user of the cane and engages a floor or ground surface while the support structures (as further disclosed herein) are retracted (i.e., not deployed). The cane 10 can further comprise a handle 30 coupled to the top end 22 of the primary leg 20. The handle 30 can have any style or shape. In exemplary aspects, the handle can be a Derby-style handle, a Fritz-style handle, an ergonomic handle, a palm-grip handle, an offset handle (with curvature at the top end of the primary leg), a tourist-style handle, an orthopedic handle, a knob-style handle, a handle featuring a novelty design (e.g., an animal shape), or combinations thereof. Optionally, the handle can be selectively removable and replaceable. Thus, in exemplary aspects, the handle 30 can be secured to the primary leg 20 using a fastener (e.g., a screw or a locking pin) that can be selectively removed to permit replacement or adjustment of the handle. Optionally, a user can replace a first handle with a second handle that is of a different type or shape than the first handle. The cane 10 can still further comprise at least two secondary legs 40 that are each pivotably coupled to the primary leg 20 between the top and bottom ends of the primary leg. As used herein, the term "pivotably coupled" is intended to encompass any connection, coupling, or engagement that permits of components relative to one another. In exemplary aspects, and as depicted throughout the Figures, such pivotable coupling can be achieved through the use of pins that are received through aligned openings defined in the components that are pivotably coupled to one another. However, it is contemplated that other connection structures can be used, provided they permit the pivotal motion disclosed herein. As further disclosed herein, each of the at least two secondary legs 40 can be pivotable between a first, retracted position (FIG. 2, for example) and a second, deployed position (FIG. 1, for example).

Figure 2:
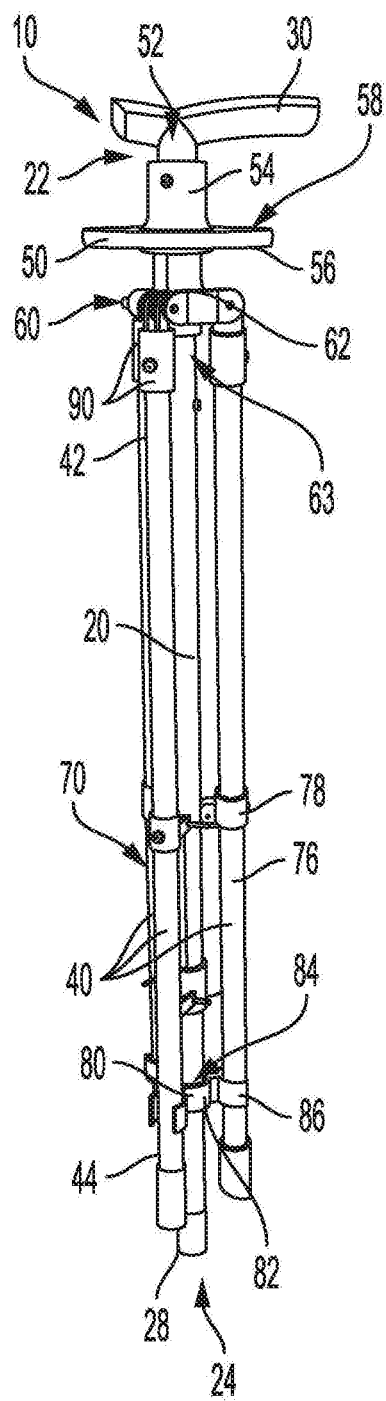
FIG. 2 is a perspective view of the deployable cane as in FIG. 1, with the cane in a retracted configuration.

In exemplary aspects, each of the at least two secondary legs 40 can comprise a proximal end 42 that is pivotably coupled to the primary leg 20 and an opposed distal end 44. In these aspects, when the at least two secondary legs 40 are in the deployed position, the distal end 44 of each secondary leg 40 and the bottom end 24 of the primary leg 20 can be configured to concurrently engage a surface upon which a user of the cane is walking or standing (e.g., a floor or a ground surface). Optionally, the bottom end 24 of the primary leg 20 can have a foot 28 (e.g., a rubber cap or a grip and/or traction-enhancing surface) that is configured to engage the surface. Similarly, in other optional aspects, it is contemplated that the distal end 44 of at least one (optionally each) of the secondary legs 40 can have a respective foot 46 (e.g., a rubber cap or a grip and/or traction-enhancing surface) that is configured to engage the surface. Optionally, in exemplary aspects, and as shown in FIGS. 3-5 and 7-9, the at least two secondary legs 40 can consist of two secondary legs. In these aspects, when the two secondary legs 40 are in the deployed position, the distal ends 44 of the two secondary legs and the bottom end 24 of the primary leg 20 can provide three points of contact with the surface upon which a user of the cane is walking or standing. Optionally, in other exemplary aspects, and as shown in FIGS. 1-2, the at least two secondary legs 40 can consist of three secondary legs. In these aspects, when the three secondary legs 40 are in the deployed position, the distal ends 44 of the three secondary legs and the bottom end 24 of the primary leg 20 can provide four points of contact with the surface upon which a user of the cane is walking or standing.

In further exemplary aspects, and as shown in FIGS. 1-2, the cane 10 can comprise a collar 50 that defines an opening 52 that receives a portion of the primary leg 20. In these aspects, the collar 50 can be secured to the primary leg 20 between the handle 30 and the proximal ends 42 of the at least two secondary legs 40. As shown in FIGS. 1-2, the collar 50 can have a sleeve portion 54 (e.g., an approximately cylindrical portion) and a flange portion 56 that extends radially outwardly from the sleeve portion. As shown, the sleeve portion 54 can be closer to the handle 30 (and the top end 22 of the primary leg 20) than the flange portion 56. In use, the upwardly facing side of the flange portion 56 can define a support surface 58 that can be used by a user of the cane to provide additional stability or support, for example, when using the cane to regain footing or otherwise lift up the body of the user. Optionally, the collar 50 can be rigidly secured to the primary leg 20 of the cane 10. For example, in some aspects, a fastener (or plurality of fasteners) can secure the collar 50 to the primary leg 20. Optionally, the collar 50 and the handle 30 of the cane 10 can be secured to the primary leg 20 using the same fastener (or plurality of fasteners). Optionally, in further aspects, it is contemplated that the collar 50 can be configured for selective axial translation relative to the primary leg 20 of the cane 10. In these aspects, it is contemplated that the collar 50 can be selectively and releasably locked in place relative to the primary leg 20 using a suitable fastener, such as a clip or pin.

Figure 3:
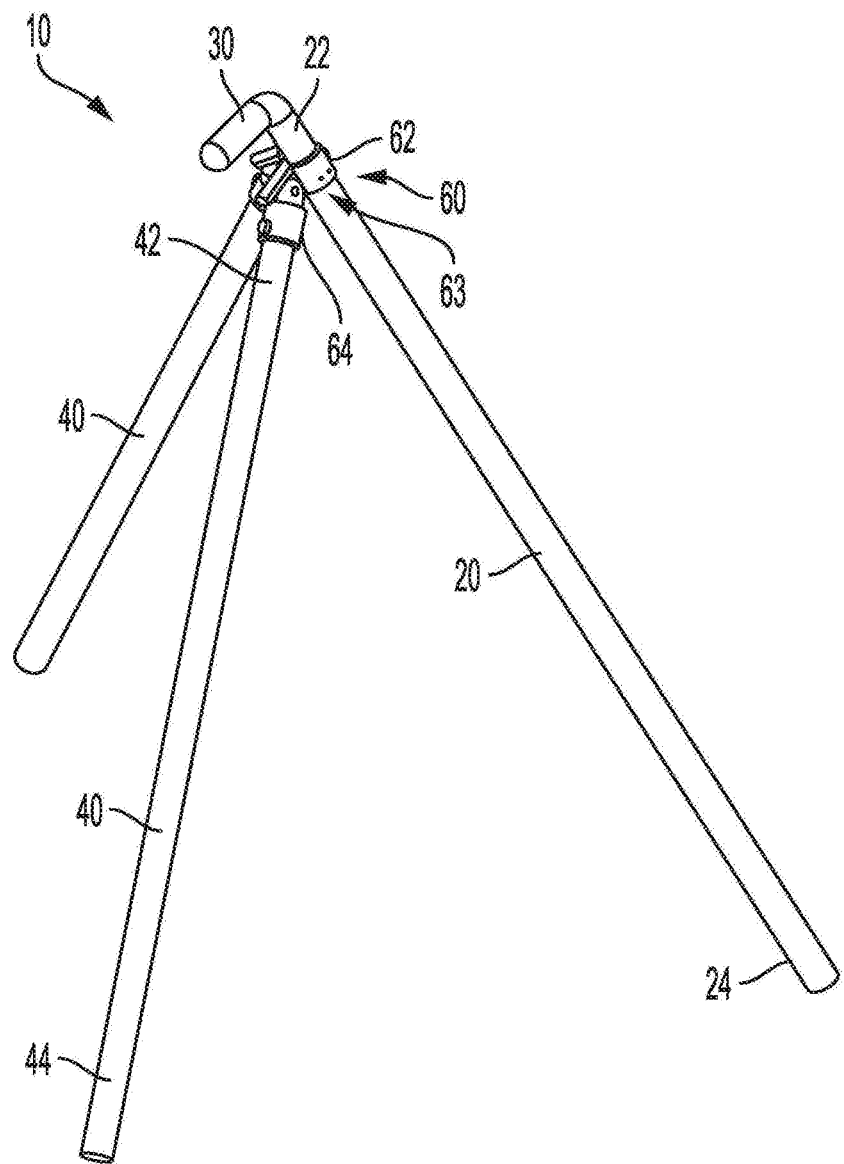
FIG. 3 is a perspective view of another deployable cane in accordance with embodiments disclosed herein, with the cane in the deployed configuration.
Figure 4:
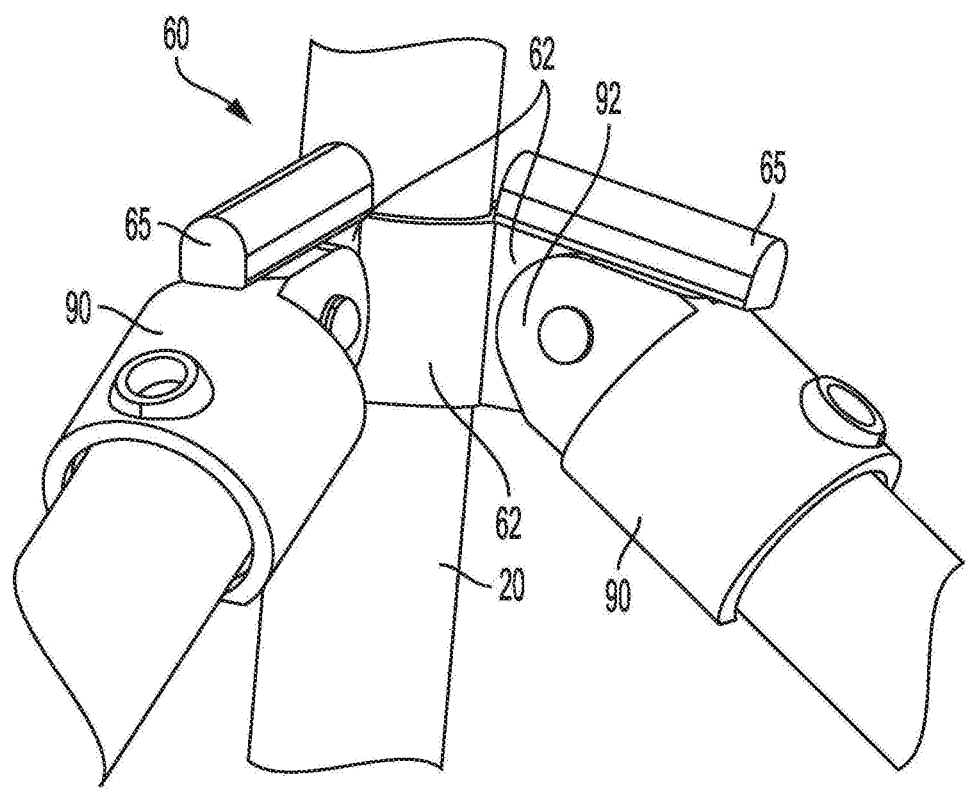
FIG. 4 is a perspective view of the deployable cane as in FIG. 3, with the cane in the deployed configuration.
Figure 5:
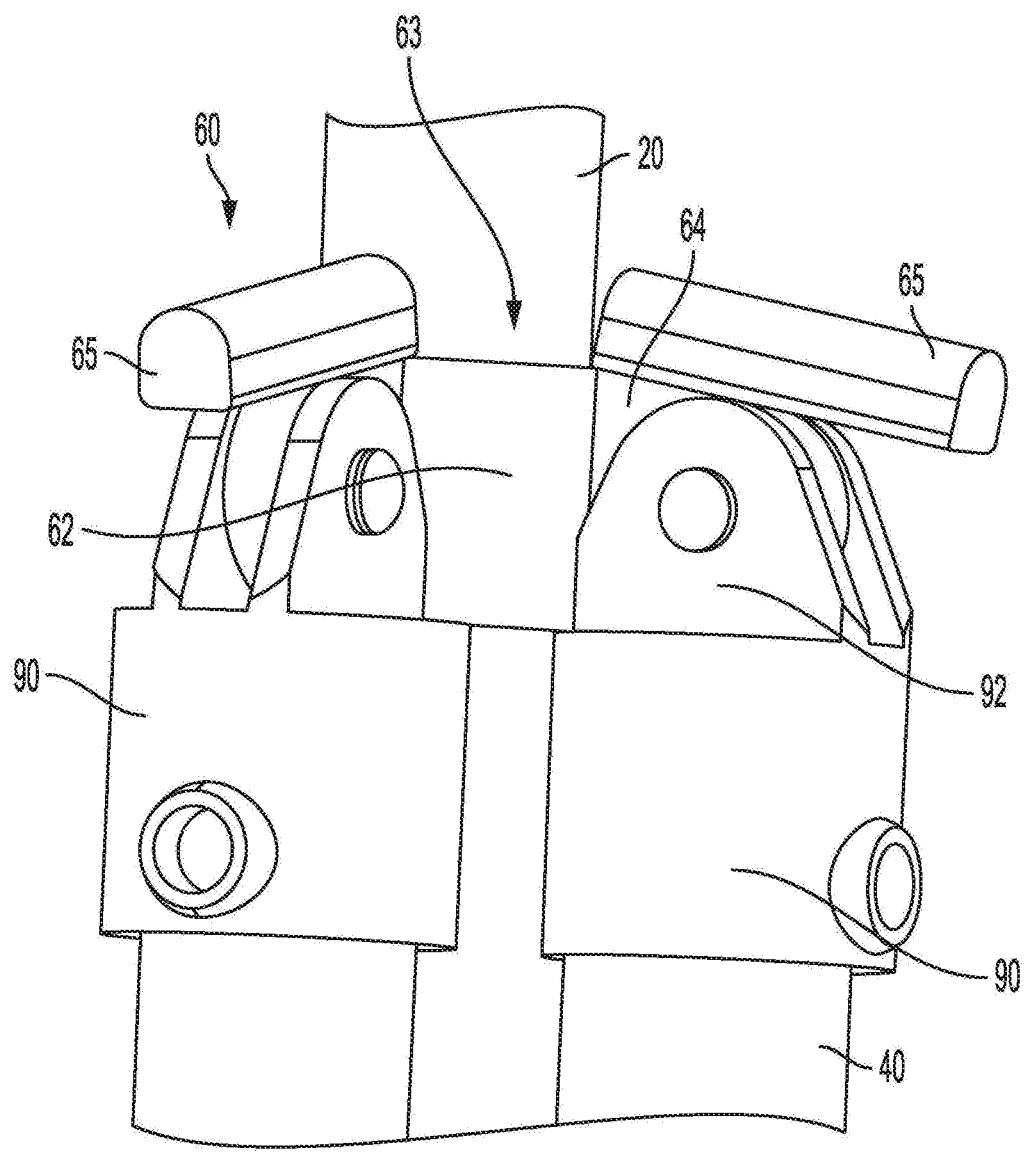
FIG. 5 is a close-up partial perspective view of the deployable cane as in FIG. 3, in the retracted configuration.

In further exemplary aspects, and as shown in FIGS. 1-5 and 7-10B, the cane 10 can comprise a connector assembly 60 having a connector body 62 that defines an opening 63 that receives a portion of the primary leg 20. The cane 10 can comprise at least two connector projections 64 extending from the connector body 62. Optionally, it is contemplated that each connector projection 64 can comprise multiple fingers or sections that are spaced apart relative to a transverse axis. As shown in FIGS. 1-5, it is contemplated that the connector projections 64 can extend radially outwardly from the connector body 62. However, it is contemplated that the connector projections 64 can extend in other directions, including downwardly. Each secondary leg 40 of the at least two secondary legs can be pivotably connected to a respective connector projection 64 of the at least two connector projections. Optionally, in exemplary aspects, and as shown in FIGS. 3-5, the connector body 62 can further comprise at least two stop elements 65. In these aspects, each of the at least two stop elements 65 can overlie a respective connector projection 64. In one configuration, each stop element 65 can be an extension of the connector body 62 that extends radially beyond, and at an angle relative to, the connector projection 64. In use, it is contemplated each of the at least two stop elements 65 can be configured to limit pivotal movement of a respective secondary leg 40 relative to the connector projection 64. More particularly, as the pivotal movement of the secondary leg 40 relative to the connector projection 64 increases, the stop element 65 can be configured to engage a portion of the proximal end 42 of the secondary leg 40 to prevent further pivotal movement. In exemplary aspects, it is contemplated that the stop element 65 can be oriented to set a maximum amount of pivotal movement of the secondary leg 40 relative to the retracted position, which can optionally correspond to a vertical orientation. In these aspects, the maximum amount of pivotal movement can be a change in angular orientation (relative to the retracted (e.g., vertical) orientation) ranging from approximately 30 degrees to approximately 60 degrees. Optionally, the maximum permitted change in angular orientation can be 60 degrees. In further exemplary aspects, it is contemplated that the angular orientation of the stop elements 65 can be selectively adjusted to modify the maximum permitted change in angular orientation of the secondary legs.

Optionally, in some aspects, and with reference to FIGS. 3-5 and 7-10B, the connector body 62 can be fixedly secured to the primary leg 20 such that the position of the connector body (relative to the primary leg) is not adjustable (i.e., the connector body is not axially translatable along a length of the primary leg). Alternatively, in other exemplary aspects, and with reference to FIGS. 1-2, the connector body 62 can be selectively axially translatable along a length of the primary leg 20 to effect movement of the at least two secondary legs about and between the retracted position and the deployed position. More particularly, when starting from the retracted position, it is contemplated that a user of the cane can selectively advance the connector body 62 in a downward direction, thereby causing increasing outward pivotal motion of the secondary legs 40 until a desired orientation of the secondary legs is reached. In these aspects, it is contemplated that the primary leg 20 can comprise a quick release mechanism (e.g., a button clip or other releasable fastener) that releasably secures the connector body 62 to the primary leg. Upon sufficient disengagement between the quick release mechanism and the connector body 62, the connector body can be selectively advanced in a downward direction relative to the primary leg 20, thereby causing deployment of the secondary legs, which provide lateral support to the primary leg. Optionally, the disengagement can occur by inward displacement of the release mechanism by the user and/or application of downward force to the connector body to overcome the retention force applied by the release mechanism.

It is further contemplated that the primary leg 20 can comprise at least one stop element 26 that is positioned downwardly of the quick release mechanism and configured to engage the connector body to limit axial translation of the connector body 62 along the primary leg. For example, it is contemplated that the at least one stop element 26 can comprise at least one button clip. Optionally, the at least one stop element 26 can comprise a plurality of stop elements (e.g., a plurality of button clips) that are axially spaced along a portion of the length of the primary leg to allow the user to select the ideal configuration of the secondary legs. In these aspects, it is contemplated that some of the stop elements can optionally be bypassed to permit further downward movement of the connector body 62. In further aspects, at least one of the stop elements (e.g., the lowest of the stop elements) can provide a hard stop that cannot be bypassed. For example, in these aspects, the hard stop can be provided by a safety collar (not shown) that defines a radially projecting lip that is configured to engage a bottom surface of the connector body to prevent further axial movement toward the bottom end of the primary leg, thereby preventing the secondary legs from slipping.

In exemplary aspects, and as shown in FIGS. 1-5 and 7-9, the cane 10 can comprise at least two sleeves 90 that each receive and are secured to a proximal end 42 of a respective secondary leg 40 of the at least two secondary legs. In these aspects, it is contemplated that each of the at least two sleeves 90 can be pivotably coupled to a respective connector projection 64 of the at least two connector projections of the connector assembly 60. As shown in FIGS. 1-5 and 7-9, each sleeve 90 can comprise a respective projection 92 that is configured for pivotable coupling to a respective connector projection 64. Optionally, it is contemplated that each sleeve projection 92 can comprise multiple fingers or sections that are spaced apart relative to a transverse axis. More generally, it is contemplated that the sleeve projections 92 and the connector projections 64 can have complementary shapes that cooperate to define an opening for receiving a pin that defines an axis for pivotal motion as disclosed herein.

In further aspects, the cane 10 can comprise a guide assembly 70 having a center coupling 72 that defines an opening 74 that receives the primary leg 20. The center coupling 72 can be secured to the primary leg 20 between the proximal ends 42 of the at least two secondary legs and the bottom end 24 of the primary leg. The guide assembly 70 can further comprise at least two extension arms 76 extending radially outwardly from the center coupling 72. Each extension arm 76 of the at least two extension arms can be pivotably coupled to the center coupling 72 and a respective secondary leg 40 of the at least two secondary legs. Optionally, in additional aspects, and as shown in FIGS. 1-2, the guide assembly 70 can further comprise at least two outer couplings 78. In these aspects, each outer coupling 78 of the at least two outer couplings can be secured to a respective secondary leg 40 of the at least two secondary legs between the proximal and distal ends 42, 44 of the secondary leg. Each extension arm 76 of the at least two extension arms can be pivotably coupled to the center coupling 72 and a respective outer coupling 78 of the at least two outer couplings. Thus, during movement of the secondary legs 40 about and between the retracted and deployed positions, the guide assembly 70 can smoothly guide and control the motion of the respective secondary legs. Additionally, the extension arms 76 can provide further stability to the secondary legs.

Figure 6:
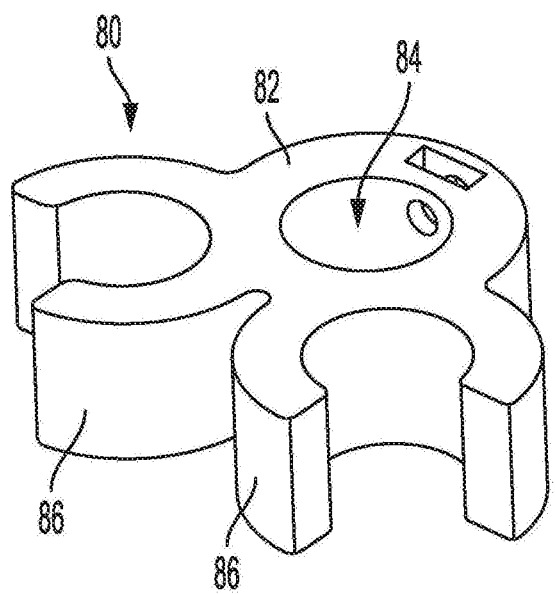
FIG. 6 is a perspective view of an exemplary retention assembly for use with the deployable cane as in FIG. 3.

In still further aspects, and with reference to FIGS. 1-2 and 6, the cane 10 can comprise a retention assembly 80 comprising a center body 82 that defines an opening 84 that receives a portion of the primary leg 20. The retention assembly 80 can be secured to the primary leg 20 between the proximal ends 42 of the at least two secondary legs 40 and the bottom end 24 of the primary leg 20. The retention assembly 80 can further comprise at least two retention elements 86 extending radially outwardly from the center body 82. As shown in FIG. 2, each retention element 86 can be configured to engage a respective secondary leg 40 of the at least two secondary legs when the at least two secondary legs are in the retracted position. In exemplary aspects, each retention element 86 can comprise a mounting clip that is configured to receive a portion of a respective secondary leg 40 of the at least two secondary legs. However, it is contemplated that any clip, clamp, clasp, hook-and-loop fastener, or other fastener that is capable of retaining the secondary legs in a retracted position as disclosed herein can be used.

In the exemplary configuration depicted in FIGS. 3-5, the at least two secondary legs 40 can consist of two secondary legs. As shown, the at least two connector projections 64 of the connector assembly can consist of two connector projections. As shown, the connector projections 64 can extend radially outwardly from the connector body 62. Optionally, the connector body can have two stop elements 65. The guide assembly and retention assembly can optionally be omitted.

Figure 7:
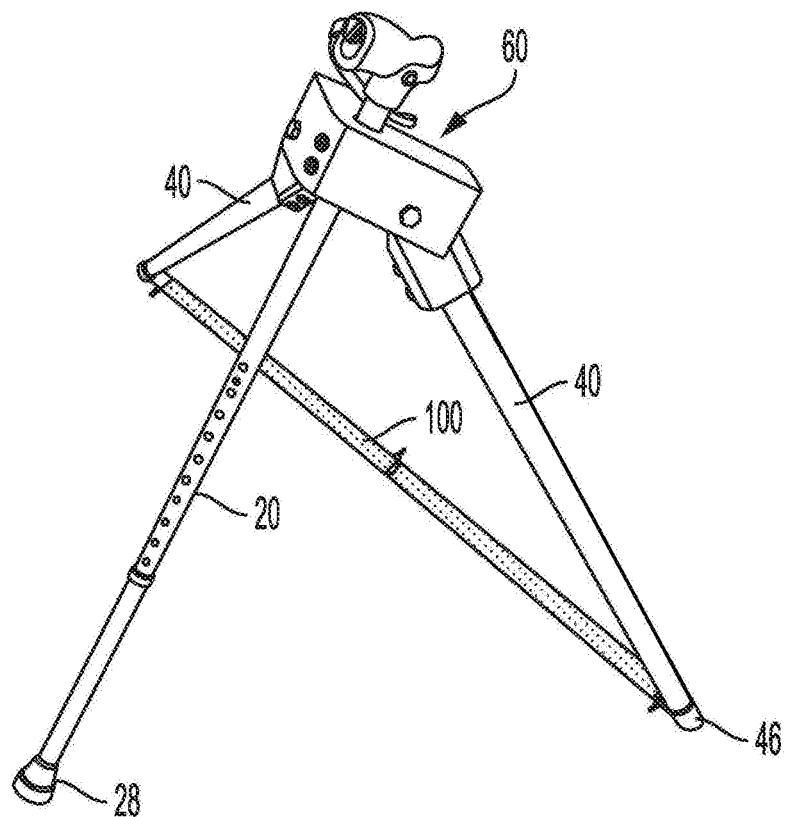
FIG. 7 is a perspective view of yet another embodiment of a deployable cane in accordance with embodiments disclosed herein, with the deployable cane in the deployed configuration.
Figure 8:
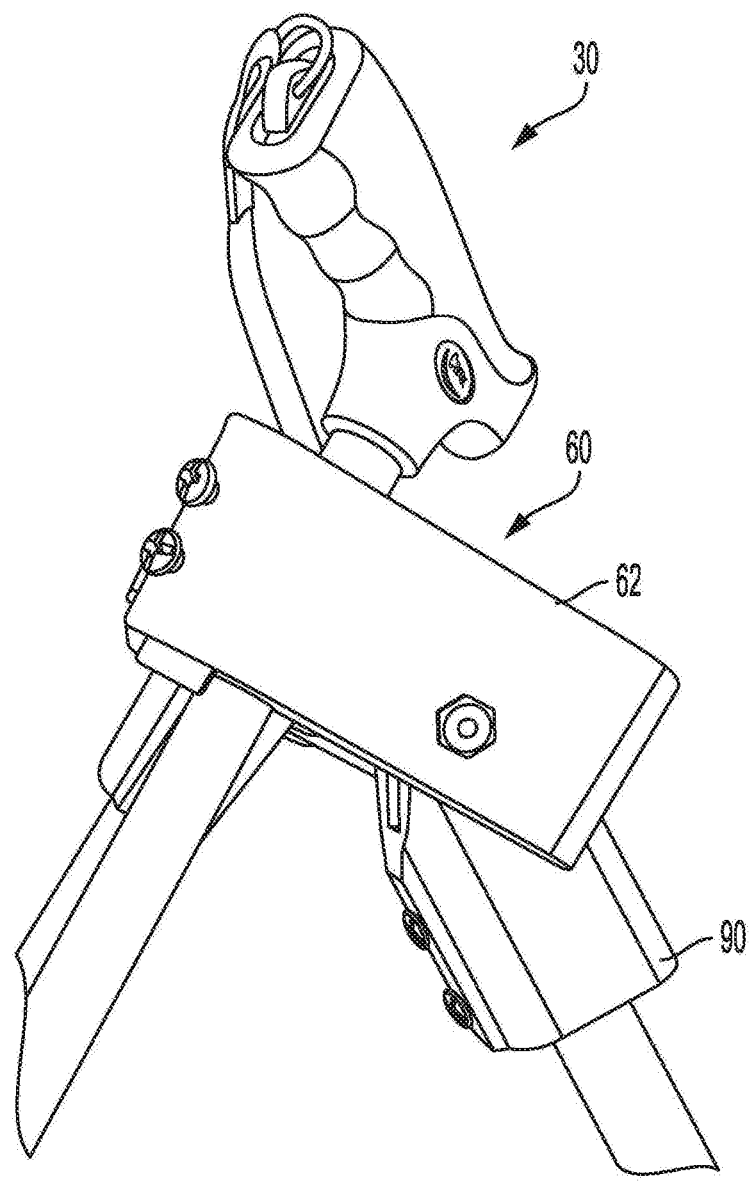
FIG. 8 is a close-up partial perspective view of the deployable cane as in FIG. 7.
Figure 9:
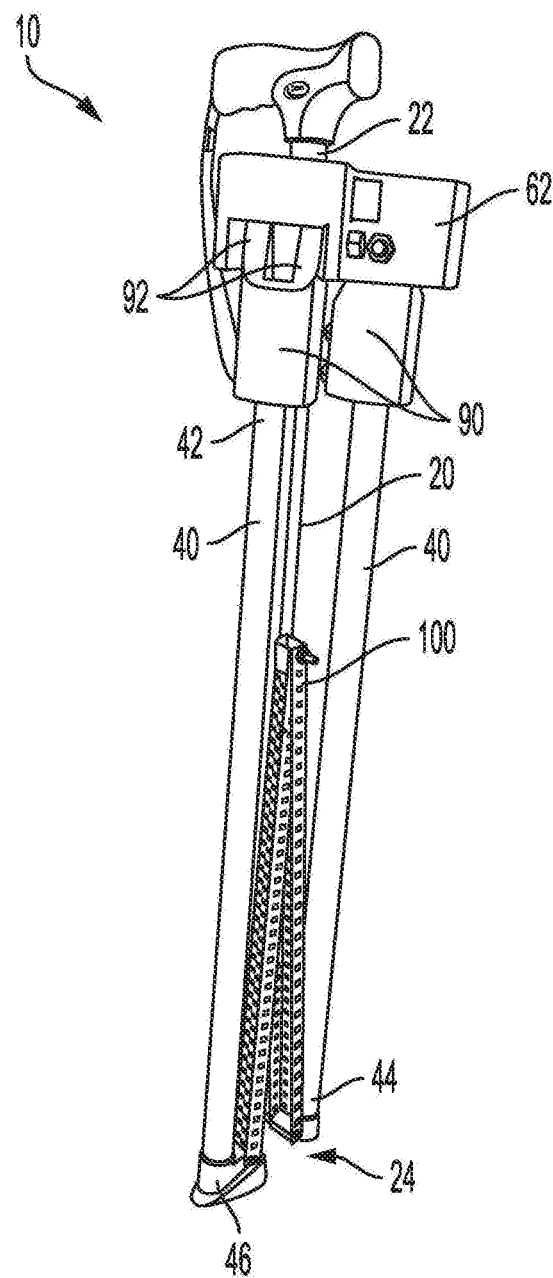
FIG. 9 is a perspective view of the deployable cane as in FIG. 7, with the deployable cane in the retracted configuration.
Figure 10A:
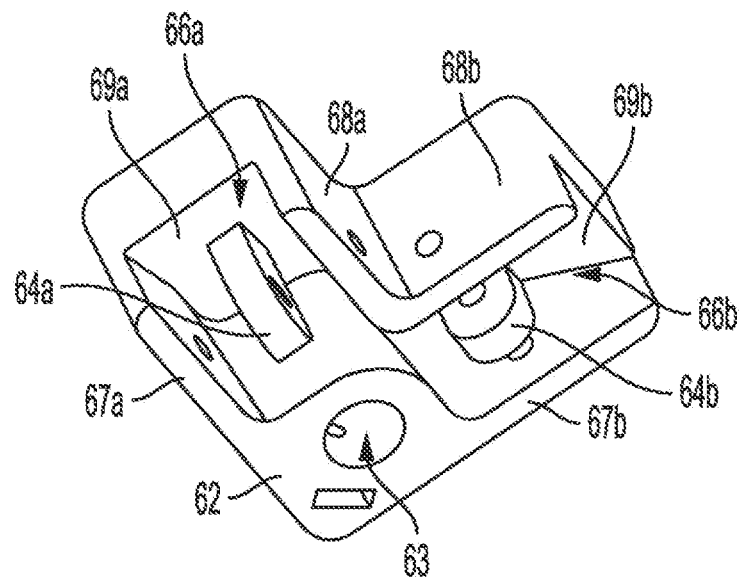
FIGS. 10A and 10B are perspective views of first and second joint components, respectively, for use with the deployable cane as in FIG. 7.
Figure 10B:
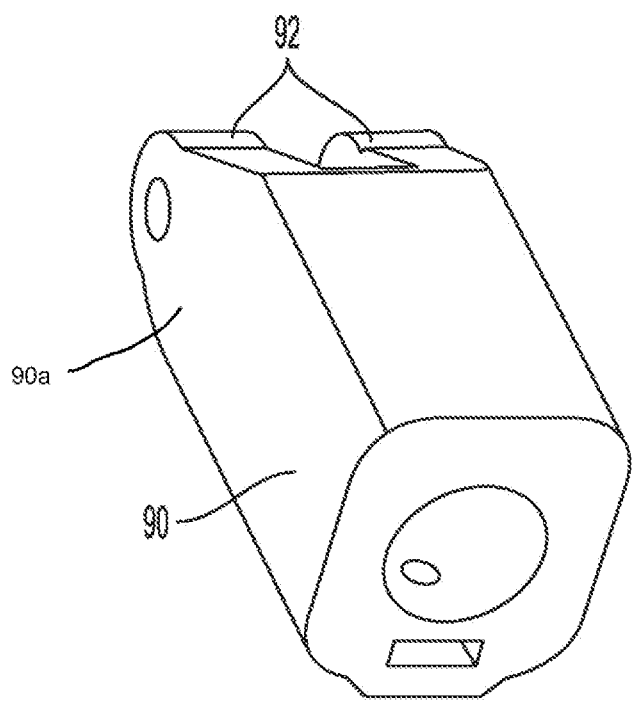

In the exemplary configuration depicted in FIGS. 7-10B, the connector body 62 can define first and second receiving spaces 66a, 66b. As shown, first and second connector projections 64a, 64b can extend, respectively, within the first and second receiving spaces 66a, 66b. Optionally, a first sleeve 90a (associated with a first secondary leg) can be at least partially received within the first receiving space 66a, and a second sleeve (associated with a second secondary leg) can be at least partially received within the second receiving space 66b, with the projections 92 of the sleeves being pivotably coupled to the connector projections (e.g., in the manner of a hinge). In exemplary aspects, the connector body 62 can have a structure as depicted in FIGS. 10A-10B. As shown, the first receiving space 66a can be defined by a first outer wall 67a, a first inner wall 68a, and a first upper wall 69a, while the second receiving space 66b can be defined by a second outer wall 67b, a second inner wall 68b, and a second upper wall 69b. Optionally, as shown, the first and second receiving spaces 66a, 66b can connect to one another. It is contemplated that the first connector projection 64a can extend downwardly into the first receiving space 66a, while the second connector projection 64b can extend downwardly into the second receiving space 66b. In this configuration, it is contemplated that the upper walls 69a, 69b can function as stop elements 65 to restrict movement of the first and second secondary legs. Optionally, in some aspects, the distal ends 44 and/or feet 46 of the two secondary legs 40 can be coupled together and stabilized by an extension arm 100. In these aspects, the extension arm 100 can comprise a first section that is pivotably coupled to the distal end 44 of a first secondary leg and a second section that is pivotably coupled to the distal end 44 of a second secondary leg, with the first and second sections being pivotably coupled to one another. In use, as shown in FIG. 7, when the first and second secondary legs are moved to the deployed position, the first and second sections of the extension arm 100 can form an approximately horizontal support structure. In the retracted position, as shown in FIG. 9, the first and second sections can pivot relative to the first and the second secondary legs and to one another to produce a minimal horizontal profile that permits retraction of the first and second secondary legs.

In use, the configurations depicted in FIGS. 3-6 and 7-10B permit a user to easily move the secondary legs between a retracted configuration and a deployed configuration by angling the primary leg 20 from a vertical orientation (in which the secondary legs are likewise vertically oriented) to an angled orientation as shown in FIGS. 3 and 7. When the primary leg 20 is angled, the angular orientation of the connector projections 64 (and the pivotably coupled secondary legs) cause the secondary legs 40 to pivot outwardly to produce a tripod structure. In this configuration, it is understood that the length of the secondary legs will be less than the length of the primary leg 20 so that in a standard (vertical) cane configuration, only the primary leg will contact the ground/floor. Optionally, in some aspects, it is contemplated that the connector projections 64 can be angularly offset by approximately 120 degrees relative to one another, with the primary leg positioned in between the two connector projections. In these aspects, it is contemplated that when the primary leg is angled downwardly as shown in FIGS. 3 and 7, the primary leg and the two secondary legs can form an approximately symmetrical tripod structure.

As further disclosed herein, the connector assembly can hold the secondary legs, and lock the secondary legs in place with screws and/or pins. The collar can fit directly on top of the connector body, and the connector body itself can be suitable for grasping, thereby providing users with a stable weight bearing component to plant their hands and hoist themselves up to standing position. To deploy the secondary legs, the user can apply pressure down onto the connector body, which shifts the secondary legs and the connector body downward, thereby deploying the secondary legs. A rubber foot can be disposed at the bottom of each secondary leg to prevent the device from slipping on smooth terrain and allow the device to be used in various environments.

When the secondary legs are deployed, the button clips (or other stop elements) can be engaged, thereby preventing the secondary legs from moving toward their respective retracted positions. The user can depress the button clips to release the secondary legs. The user can then lift the connector body upward to close the secondary legs, thereby reverting the device into the traditional cane position, with only the primary leg in contact with the ground/floor. As the device is reverted into the traditional cane position, the secondary legs can be moved medially toward the primary leg, and the connector body is shifted upward toward the handle.

In exemplary aspects, the primary leg of the cane can be adjusted to the user's preferred cane height in the walking position. The primary leg can comprise aluminum or other similar lightweight metal materials.

It is contemplated that the collar, the connector assembly, the guide assembly, the retention assembly, and/or various other components disclosed herein can be 3-D printed, injection molded, or manufactured by any other method known to those skilled in the art.

Optionally, foam bumpers or other dampening material can be attached to portions (e.g., the bottom) of each extension arm to allow for simple deployment of the secondary legs and minimize damaging mechanical engagement with other device components.

In exemplary aspects, it is contemplated that the disclosed connector assembly 60 (and, optionally, the disclosed guide assembly 70 and/or retention assembly 80) can be attached to an existing cane to produce a retrofitted cane that operates as disclosed herein.

Optionally, the connector body can comprise a corner swivel socket-type pipe joint (e.g., model no. C52-555) that is modified to restrict pivotal movement of the joint using stop elements as disclosed herein.

Although referred to herein as a deployable cane having two or three secondary legs, in further embodiments, the deployable cane can have four, five, six, or more deployable secondary legs.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A cane comprising: a primary leg having a top end and an opposed bottom end; a handle coupled to the top end of the primary leg; and at least two secondary legs that are each pivotably coupled to the primary leg between the top and bottom ends of the primary leg, wherein each of the at least two secondary legs is pivotable between a first, retracted position and a second, deployed position.

Aspect 2: The cane of aspect 1, wherein each of the at least two secondary legs comprises a proximal end that is pivotably coupled to the primary leg and an opposed distal end, wherein when the at least two secondary legs are in the deployed position, the distal end of each secondary leg and the bottom end of the primary leg are configured to concurrently engage a surface upon which a user of the cane is walking or standing.

Aspect 3: The cane of aspect 2, wherein the at least two secondary legs consists of two secondary legs, and wherein when the two secondary legs are in the deployed position, the distal ends of the two secondary legs and the bottom end of the primary leg provide three points of contact with the surface.

Aspect 4: The cane of aspect 2, wherein the at least two secondary legs consists of three secondary legs, and wherein when the three secondary legs are in the deployed position, the distal ends of the three secondary legs and the bottom end of the primary leg provide four points of contact with the surface.

Aspect 5: The cane of any one of aspects 2-4, wherein the handle is selectively removable and replaceable.

Aspect 6: The cane of any one of aspects 2-5, further comprising a collar that defines an opening that receives the primary leg, wherein the collar is secured to the primary leg between the handle and the proximal ends of the at least two secondary legs.

Aspect 7: The cane of aspect 6, wherein the collar has a sleeve portion and a flange portion that extends radially outwardly from the sleeve portion to define a support surface.

Aspect 8: The cane of any one of aspects 2-7, further comprising a connector assembly having: a connector body that defines an opening that receives the primary leg; and at least two connector projections extending from the connector body, wherein each secondary leg of the at least two secondary legs is pivotably connected to a respective connector projection of the at least two connector projections.

Aspect 9: The cane of aspect 8, wherein the connector body is selectively axially translatable along a length of the primary leg to effect movement of the at least two secondary legs about and between the retracted position and the deployed position.

Aspect 10: The cane of aspect 9, wherein the primary leg comprises at least one stop element configured to engage the connector body to limit axial translation of the connector body along the primary leg.

Aspect 11: The cane of aspect 10, wherein the at least one stop element comprises at least one button clip.

Aspect 12: The cane of any one of aspects 2-11, further comprising a guide assembly having: a center coupling that defines an opening that receives the primary leg and is secured to the primary leg between the proximal ends of the at least two secondary legs and the bottom end of the primary leg; and at least two extension arms extending radially outwardly from the center coupling, wherein each extension arm of the at least two extension arms is pivotably coupled to the center coupling and a respective secondary leg of the at least two secondary legs.

Aspect 13: The cane of aspect 12, wherein the guide assembly further comprises at least two outer couplings, wherein each outer coupling of the at least two outer couplings is secured to a respective secondary leg of the at least two secondary legs between the proximal and distal ends of the secondary leg, and wherein each extension arm of the at least two extension arms is pivotably coupled to the center coupling and a respective outer coupling of the at least two outer couplings.

Aspect 14: The cane of any one of aspects 2-13, further comprising a retention assembly comprising: a center body that defines an opening that receives the primary leg and is secured to the primary leg between the proximal ends of the at least two secondary legs and the bottom end of the primary leg; and at least two retention elements extending radially outwardly from the center body and configured to engage a respective secondary leg of the at least two secondary legs when the at least two secondary legs are in the retracted position.

Aspect 15: The cane of aspect 14, wherein each retention element comprises a mounting clip that is configured to receive a portion of a respective secondary leg of the at least two secondary legs.

Aspect 16: The cane of aspect 3, further comprising: a connector assembly having: a connector body that defines an opening that receives the primary leg; and at least two connector projections extending from the connector body; and two sleeves that each receive and are secured to a proximal end of a respective secondary leg of the two secondary legs, wherein each of the two sleeves is pivotably coupled to a respective connector projection of the two connector projections.

Aspect 17: The cane of aspect 16, wherein the connector body is not axially translatable relative to a length of the primary leg.

Aspect 18: The cane of aspect 16 or aspect 17, wherein the connector body further comprises two stop elements, wherein each of the two stop elements overlies a respective connector projection and is configured to limit pivotal movement of a respective secondary leg relative to the connector projection.

Aspect 19: The cane of any one of aspects 16-18, wherein the two connector projections extend radially outwardly from the connector body.

Aspect 20: The cane of aspect 18, wherein the connector body further defines first and second receiving spaces, wherein a first connector projection of the two connector projections extends downwardly into the first receiving space, wherein a second connector projection of the two connector projections extends downwardly into the second receiving space, wherein a first sleeve of the two sleeves is at least partially received within the first receiving space, and wherein a second sleeve of the two sleeves is at least partially received within the second receiving space.

Although the foregoing invention has been described in some detail by way of illustration and example for purposes of clarity of understanding, certain changes and modifications may be practiced within the scope of the appended claims.

What is claimed is:

1. A cane comprising:
   a primary leg having a top end and an opposed bottom end;
   a handle coupled to the top end of the primary leg;
   two secondary legs that are each pivotably coupled to the primary leg between the top and bottom ends of the primary leg, wherein each of the two secondary legs is pivotable between a first, retracted position and a second, deployed position, wherein each of the two secondary legs comprises a proximal end that is pivotably coupled to the primary leg and an opposed distal end, wherein when the two secondary legs are in the deployed position, the distal end of each secondary leg and the bottom end of the primary leg are configured to concurrently engage a surface upon which a user of the cane is walking or standing;
   a connector assembly having:
      a connector body that defines an opening that receives the primary leg; and
      at least two connector projections extending from the connector body; and
   two sleeves that each receive and are secured to the proximal end of a respective secondary leg of the two secondary legs,
   wherein each of the two sleeves is pivotably coupled to a respective connector projection of the at least two connector projections,
   wherein when the two secondary legs are in the deployed position, the distal ends of the two secondary legs and the bottom end of the primary leg provide three points of contact with the surface,
   wherein the connector body further comprises two stop elements, wherein each of the two stop elements overlies a respective connector projection and is configured to limit pivotal movement of a respective secondary leg relative to the connector projection, and
   wherein the connector body further defines first and second receiving spaces, wherein a first connector projection of the least two connector projections extends downwardly into the first receiving space, wherein a second connector projection of the least two connector projections extends downwardly into the second receiving space, wherein a first sleeve of the two sleeves is at least partially received within the first receiving space, and wherein a second sleeve of the two sleeves is at least partially received within the second receiving space.

2. The cane of claim 1, wherein the handle is selectively removable and replaceable.

3. The cane of claim 1, further comprising a collar that defines an opening that receives the primary leg, wherein the collar is secured to the primary leg between the handle and the proximal ends of the two secondary legs.

4. The cane of claim 3, wherein the collar has a sleeve portion and a flange portion that extends radially outwardly from the sleeve portion to define a support surface.

5. The cane of claim 1, wherein the connector body is selectively axially translatable along a length of the primary leg to effect movement of the at least two secondary legs about and between the retracted position and the deployed position.

6. The cane of claim 5, wherein the primary leg comprises at least one stop element configured to engage the connector body to limit axial translation of the connector body along the primary leg.

7. The cane of claim 6, wherein the at least one stop element comprises at least one button clip.

8. The cane of claim 1, further comprising a guide assembly having:
   a center coupling that defines an opening that receives the primary leg and is secured to the primary leg between the proximal ends of the two secondary legs and the bottom end of the primary leg; and
   two extension arms extending radially outwardly from the center coupling, wherein each extension arm of the two extension arms is pivotably coupled to the center coupling and a respective secondary leg of the two secondary legs.

9. The cane of claim 8, wherein the guide assembly further comprises two outer couplings, wherein each outer coupling of the two outer couplings is secured to a respective secondary leg of the two secondary legs between the proximal and distal ends of the secondary leg, and wherein each extension arm of the two extension arms is pivotably coupled to the center coupling and a respective outer coupling of the two outer couplings.

10. The cane of claim 1, further comprising a retention assembly comprising:
   a center body that defines an opening that receives the primary leg and is secured to the primary leg between the proximal ends of the at least two secondary legs and the bottom end of the primary leg; and
   two retention elements extending radially outwardly from the center body and configured to engage a respective secondary leg of the two secondary legs when the two secondary legs are in the retracted position.

11. The cane of claim 10, wherein each retention element comprises a mounting clip that is configured to receive a portion of a respective secondary leg of the two secondary legs.

12. The cane of claim 1, wherein the connector body is not axially translatable relative to a length of the primary leg.

13. The cane of claim 1, wherein the two connector projections extend radially outwardly from the connector body.

14. The cane of claim 1, further comprising an extension arm comprising first and second sections that are each pivotably coupled to respective distal ends of the two secondary legs, wherein the first and second sections are pivotably coupled to each other.

* * * * *